(12) United States Patent
Rachford

(10) Patent No.: US 7,727,643 B2
(45) Date of Patent: Jun. 1, 2010

(54) TUNABLE NEGATIVE REFRACTIVE INDEX COMPOSITE

(75) Inventor: Frederic J Rachford, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 923 days.

(21) Appl. No.: 11/279,460

(22) Filed: Apr. 12, 2006

(65) Prior Publication Data

US 2007/0242360 A1 Oct. 18, 2007

(51) Int. Cl.
*B32B 15/04* (2006.01)
(52) U.S. Cl. .................................. 428/693.1; 324/200
(58) Field of Classification Search .............. 428/693.1, 428/692.1, 446, 448, 615, 620; 257/421–427; 333/99 PL, 219.2
See application file for complete search history.

(56) References Cited

U.S. PATENT DOCUMENTS 5,320,881 A * 6/1994 Vittoria .................. 427/596
5,858,565 A * 1/1999 Victora et al. ............ 428/819.1
6,055,179 A   4/2000 Koganei et al.
2005/0208694 A1 * 9/2005 Yue et al. ................. 438/31

OTHER PUBLICATIONS

Liu et al., "Barium ferrite (BaFe12O9) thin films prepared by pulsed laser deposition on MgO buffered Si Substrates." Applied Physics A: Materials Science & Processing 80(2003): 611-614.*
Kozyrev et al., "Wave propagation in nonlinear left-handed transmission line media" *Appl. Phys. Lett.*, 87, 121109 (2005).
Shadrivov et al., "Nonlinear left-handed metamaterials" *Radio Sci.*, 40, RS3S90 (2005).
Vesalago, "The Electrodynamics of Substances with Simultaneously Negative Values of ε and μ" *Sov. Phys. Usp.*, 10(4), 509 (1968).
Koschny et al., "Resonant and antiresonant frequency dependence of the effective parameters of metamaterials" Phys. Rev. E, 68, 065602(R) (2003).
Chettiar et al., "Negative index metamaterial combining megnetic resonators with metal film" Optics Express, 14 (17), 7872-7877 (2006).
Counterpart PCT search report and written opinion.

* cited by examiner

*Primary Examiner*—Holly Rickman
*Assistant Examiner*—Lisa Chau
(74) *Attorney, Agent, or Firm*—Amy L. Ressing; Joseph T. Grunkemeyer

(57) ABSTRACT

A composite having a stack of a repeating pattern of layers of: a layer of a nonconductive magnetic material, a first layer of a dielectric material; a layer of a semiconducting material; and a second layer of the dielectric material. The composite has a magnetic resonance frequency and a magnetic antiresonance frequency and a plasma frequency at higher frequencies than the magnetic resonance frequency.

18 Claims, 6 Drawing Sheets

TUNABLE NEGATIVE REFRACTIVE INDEX COMPOSITE

FIELD OF THE INVENTION

The invention generally relates to negative index of refraction composites.

DESCRIPTION OF RELATED ART

Negative index of refraction has been demonstrated in conductive element composite structures and negative refraction (an effective negative refractive index) has been observed in photonic crystal media. The first such conductive element composite consisted of split ring resonators and wire arrays printed on standard circuit board. These structures are generally fragile, have a narrow band pass and cannot be dynamically tuned in frequency of operation. Similarly, the negative refractive pass bands of photonic crystal materials are not dynamically tunable. In both cases tuning the pass band requires a re-fabrication of the composite. In addition unit cells of photonic crystal negative index structures are of the order of half wavelength of the electromagnetic wave, causing large spurious diffractive effects and other difficulties in the fabrication of curved optics.

SUMMARY OF THE INVENTION

The invention comprises a composite comprising a stack of a repeating pattern of layers of: a layer of a nonconductive magnetic material, a first layer of a dielectric material; a layer of a semiconducting material; and a second layer of the dielectric material. The composite has a magnetic resonance frequency and a magnetic anti-resonance frequency and a plasma frequency at higher frequencies than the magnetic resonance frequency.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

The invention may provide a durable and tunable composite structure for the production of negative index of refraction or small positive index components for microwave/millimeter wave optics applications and for phase compensation in optic or guided wave structures. The desired frequency band of negative index of refraction and/or small positive index of refraction is referred to herein as the "region of operation."

Figure 1:
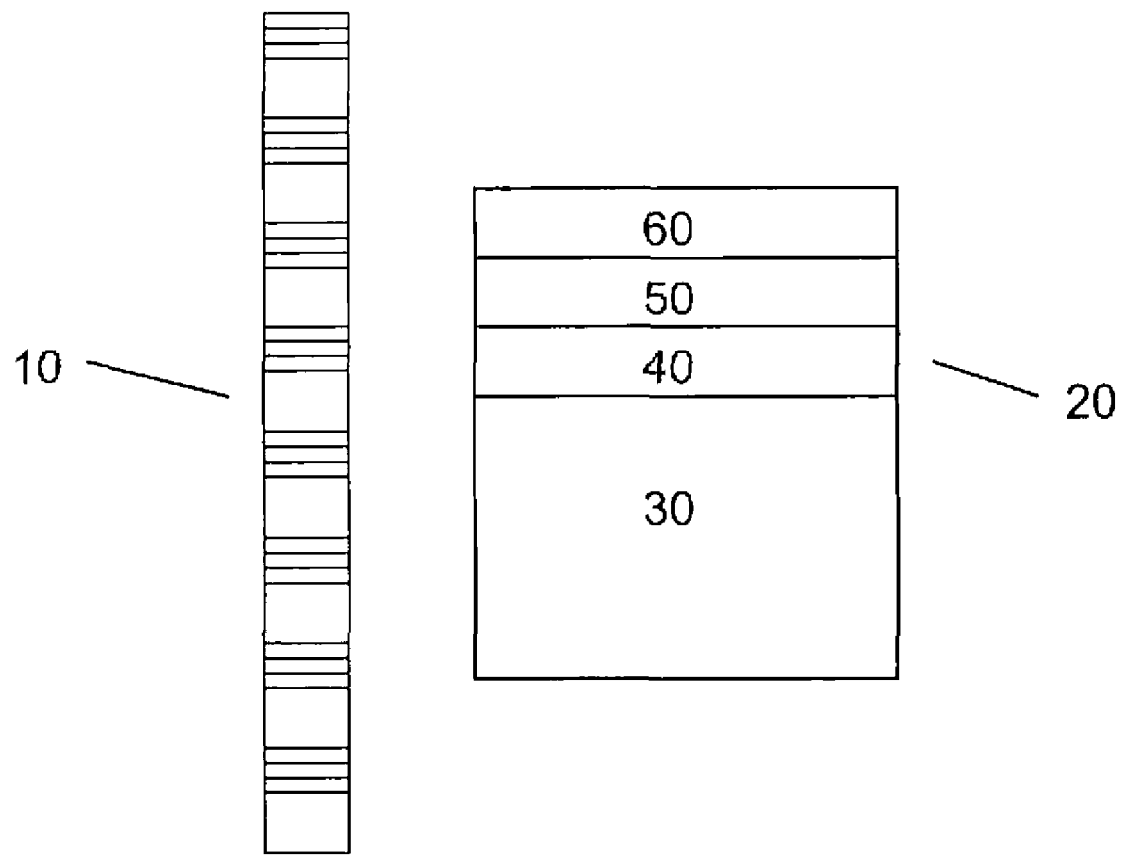
FIG. 1 schematically illustrates the arrangement of layers in the composite.

The composite comprises multiple layers of a non-conductive magnetic material such as ferrite combined with low carrier concentration semiconductor such as near "intrinsic" or very lightly doped silicon or gallium arsenide. The ferrite and silicon are separated by a compatible low loss dielectric material such as sapphire or magnesium oxide or even air. A [magnetic/dielectric/semiconductor/dielectric] stack unit is repeated one or more times, including but not limited to, 2, 3, 4, 5, 6, 7, 8, 9, and 10-100 or 1000 times. FIG. 1 schematically illustrates a stack 10 of repeating units 20, each having a magnetic layer 30, first dielectric layer 40, semiconductive layer 50, and second dielectric layer 60.

Figure 2:
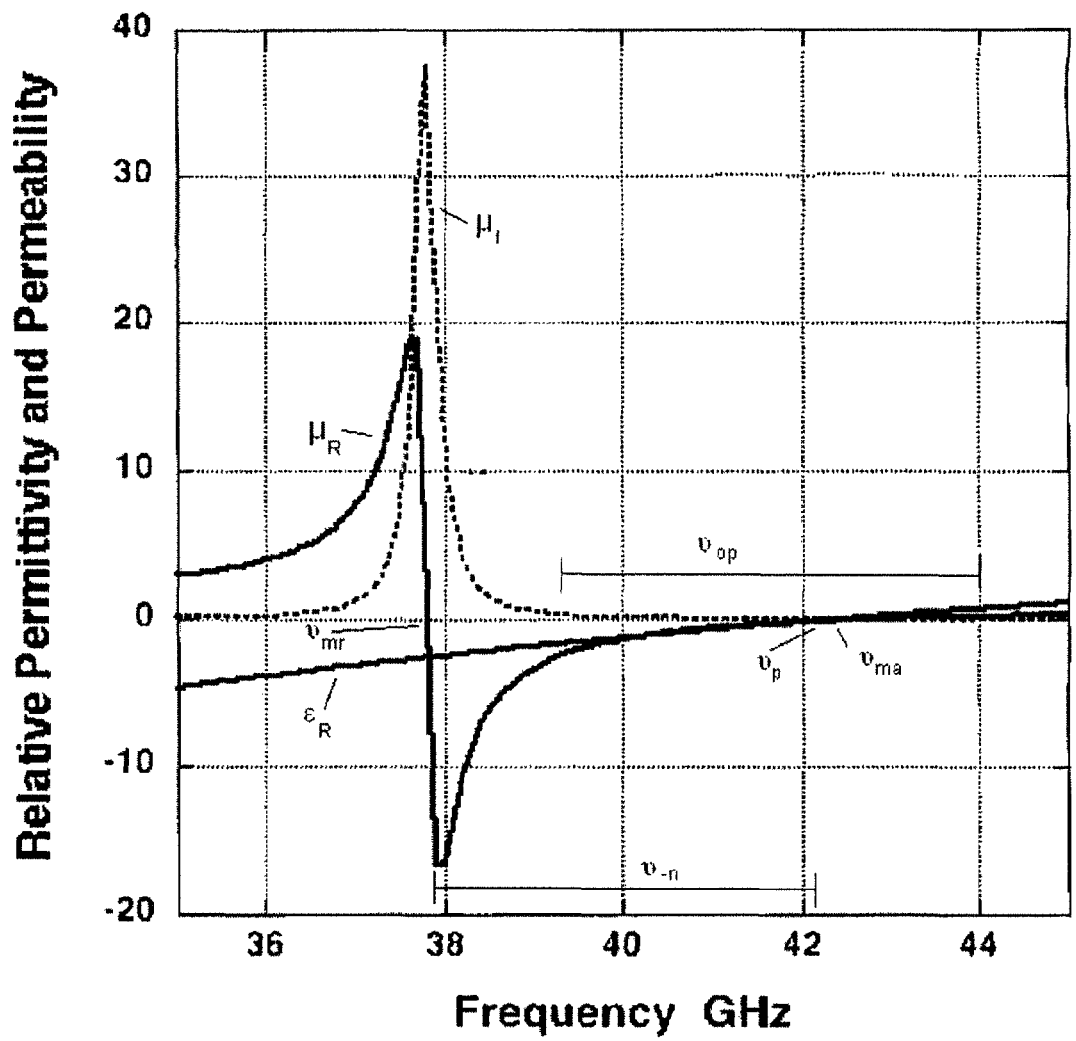
FIG. 2 is an example graph of permittivity and permeability using barium M ferrite, p-type silicon, and sapphire.

The magnetic material is selected to have a magnetic resonance frequency that is below the region of operation. (All electromagnetic and optical quantities described in the specification and claims refer to those quantities at equilibrium for a given frequency.) The magnetic resonance frequency can be a ferro- or ferrimagnetic resonance frequency, and is the frequency at which the real part of the magnetic susceptibility (permeability −1) of the composite crosses zero from positive values on the low frequency side to negative values on the high frequency side. Generally, it would be expected that this frequency would be the same as or close to the magnetic resonance frequency of the magnetic material alone, as the other materials would have little to no contribution to the magnetic susceptibility or permeability of the composite. The graph in FIG. 2 shows the frequency band of operation ($v_{op}$) and the real component of the permeability ($\mu_R$). $\mu_R$ crosses the X-axis near the magnetic resonance frequency ($v_{mr}$) and is negative for the entire range between the magnetic resonance frequency and the magnetic anti-resonance frequency ($v_{ma}$). This negative $\mu_R$ range is generally broader when the magnetic resonance is stronger.

The line-width of the magnetic resonance may be narrow enough to reduce the magnetic losses in the region of operation at frequencies greater than the magnetic resonance frequency though moderate magnetic loss may be tolerated depending on the application. The magnetic losses correspond to the imaginary component of the permeability ($\mu_1$). FIG. 2 shows a narrow magnetic resonance and a corresponding narrow loss peak in $\mu_1$. Thus $\mu_1$ is small in the band of operation.

The semiconductor may be chosen so as to have sufficiently large inelastic scattering length and sufficient crystalline dimensions so that the carriers will behave as an electron (or hole) gas in the band of operation. The carrier concentration in the semiconductor and the spatial dilution of the semiconducting component of the stack can be chosen so that the effective stack carrier concentration positions the frequency at which the real part of the permittivity of the stack ($\in_R$) crosses from negative to positive (the effective plasma frequency) above the magnetic resonance frequency. The plasma frequency may be chosen close to the magnetic anti-resonance frequency, such as within about 5%, 10%, 20%, or 50% of the magnetic anti-resonance frequency. FIG. 2 shows $\in_R$ crossing the X-axis at the plasma frequency ($v_p$), at a point close to $v_{ma}$. The Drude equation was employed to project the permittivity for the composite taking into account the permittivity contributions of the non-conductive media. The relative proportions of ferrite/dielectric/semiconductor/dielectric were assumed to be 25/2/1/2.

Figure 3:
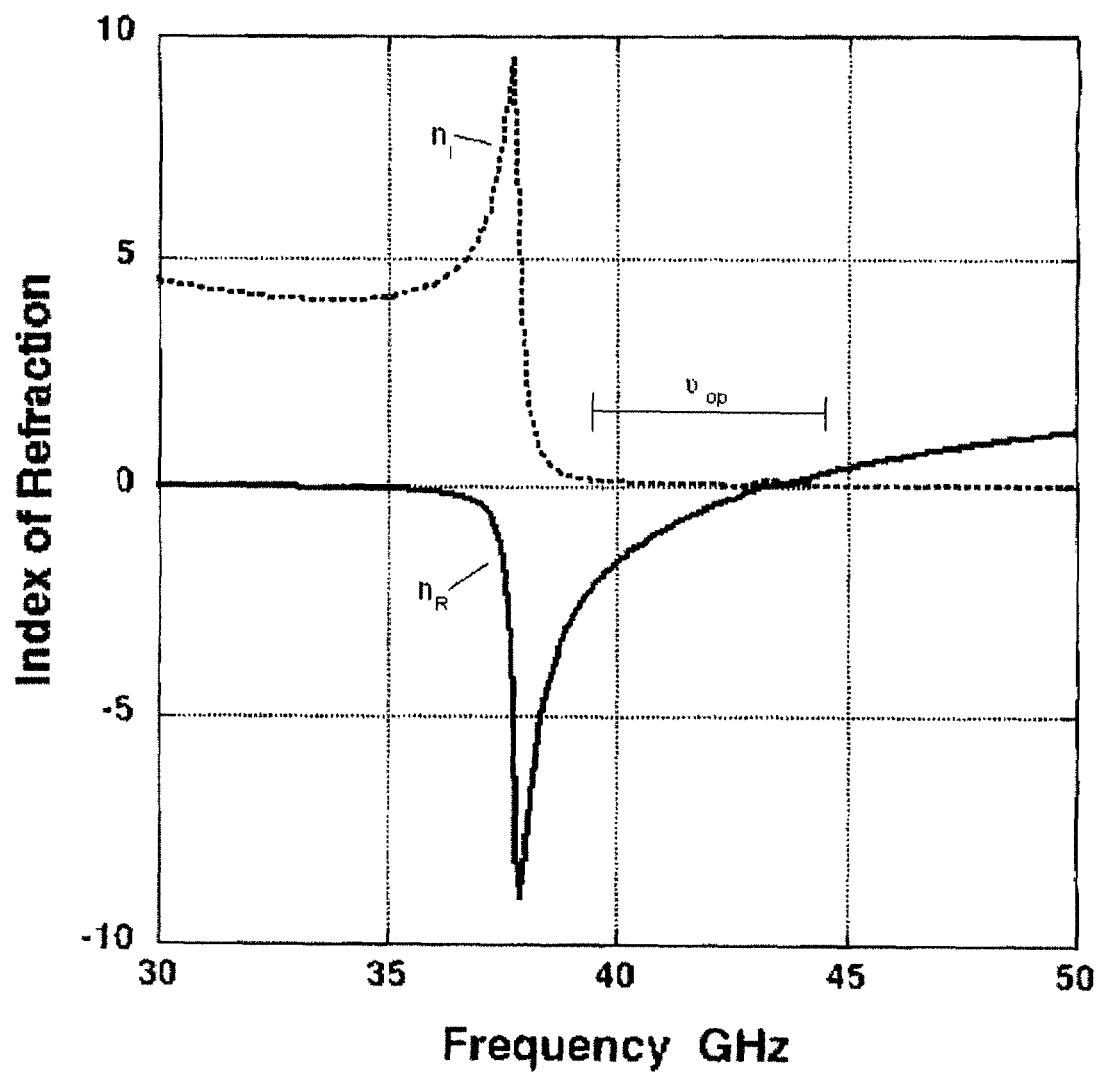
FIG. 3 shows the complex index of refraction for the same composite.
Figure 4:
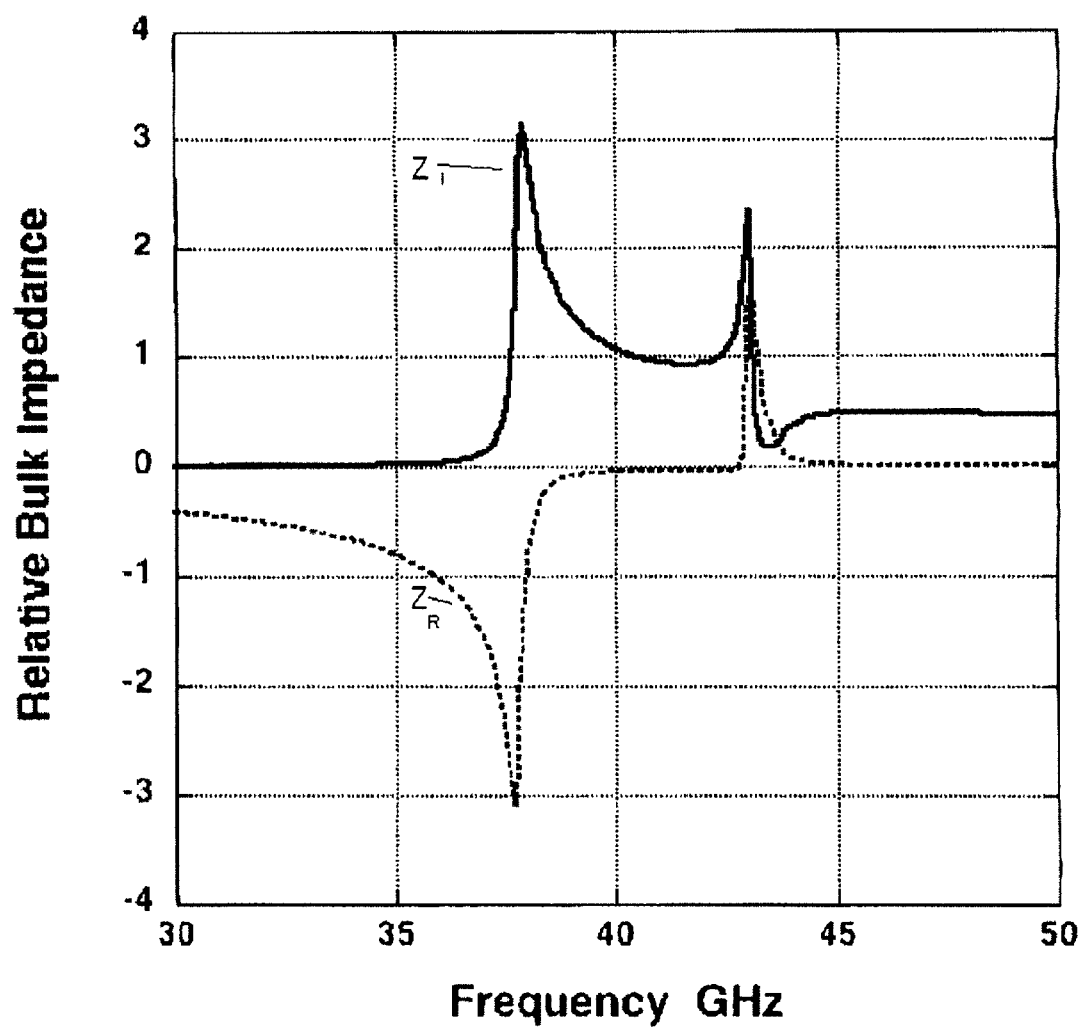
FIG. 4 shows the complex bulk impedance for the same composite.

The composite has negative permittivity and negative permeability in the band between $v_{mr}$ and the smaller of $v_{ma}$ and $v_p$. By definition, this band has a negative index of refraction, shown as $v_{-n}$ in FIG. 2. Above this band, one or both of the permittivity and permeability are positive, resulting in a positive index of refraction. The band of operation includes a portion of the negative index band that also has low loss (low $\mu_I$) and a portion of the positive index band having a small index. FIG. 3 shows the real ($n_R$) and imaginary ($n_I$) indices of refraction and the band of operation ($v_{op}$) for same composite as FIG. 2. Within the band, $n_I$ is small, so losses are low. FIG. 4 shows the complex bulk impedance.

The thickness of the repeating pattern of layers may be less than or much less than an electromagnetic wavelength in the material at the frequency of operation in order that an effective permittivity and permeability of the stack medium can be defined in a mean field approximate sense. The maximum thickness of the pattern of layers may defined relative to the free-space wavelength of the magnetic anti-resonance frequency. The thickness of the repeating pattern of layers may be, but is not limited to, no more than about this wavelength or about one fifth, about one tenth, about one twentieth, or about one hundredth of this wavelength. The thickness may also be determined by designating a band of operation containing the magnetic anti-resonance frequency. The composite has a maximum absolute value of the index of refraction within the band of operation. The thickness of the repeating unit of layers may be, but is not limited to, no more than about one fifth, about one tenth, about one twentieth, or about one hundredth of the wavelength of the magnetic anti-resonance frequency divided by the maximum absolute value of the index of refraction. Light in the band of operation may then be transmitted or allowed to transmit through the composite.

Suitable magnetic materials include, but are not limited to, a ferrite, barium M ferrite, magnetic spinel, and artificial ferrites such as metallic, magnetic particles in a nonconductive binder.

Suitable semiconducting materials include, but are not limited to, silicon, lightly doped silicon, gallium arsenide, and lightly doped gallium arsenide. In some embodiments the carriers may be isolated in the semiconductor by quantum well structures.

The dielectric layers may be low loss and separate the semiconductor layers from the magnetic layers to limit losses due to the interaction of the self magnetic fields induced by currents in the semiconductor with the magnetic component of the stack. The dielectric material may have a loss tangent less than, but not limited to, about 0.05 or about 0.02 in the frequency range of operation above the magnetic resonance frequency. Suitable dielectric materials include, but are not limited to, sapphire, magnesium oxide, air, and vacuum.

Figure 5:
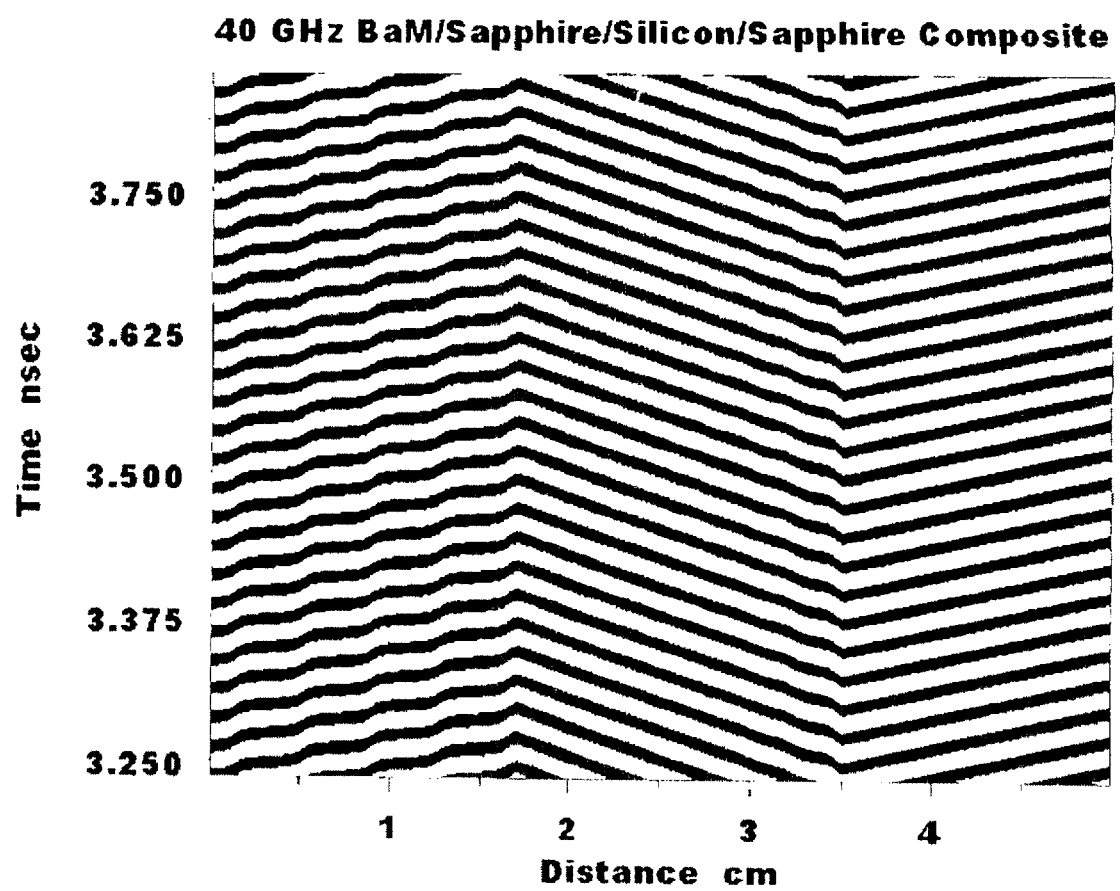
FIG. 5 shows a finite difference time domain simulation generated plot of the interaction of a 40 GHz electromagnetic wave interacting with the composite.

FIG. 5 shows a finite difference time domain simulation generated plot of the interaction of a 40 GHz electromagnetic wave interacting with the [BaM/sapphire/silicon/sapphire] composite. The plot displays the crests and troughs of the 40 GHz wave entering in free space from the left, hitting the front surface of the composite at 1.7 cm, transiting the material, and exiting to free space at 3.5 cm. The reflection of the wave at the front surface of the composite produces the ripples in the electric field seen on the left. The slope of the time progress of the wave is proportional to the index of refraction in the medium. Comparing the slope of the wave crests in the material with the slope in free space it is found that at 40 GHz the composite has an effective real index of −1.64.

Figure 6:
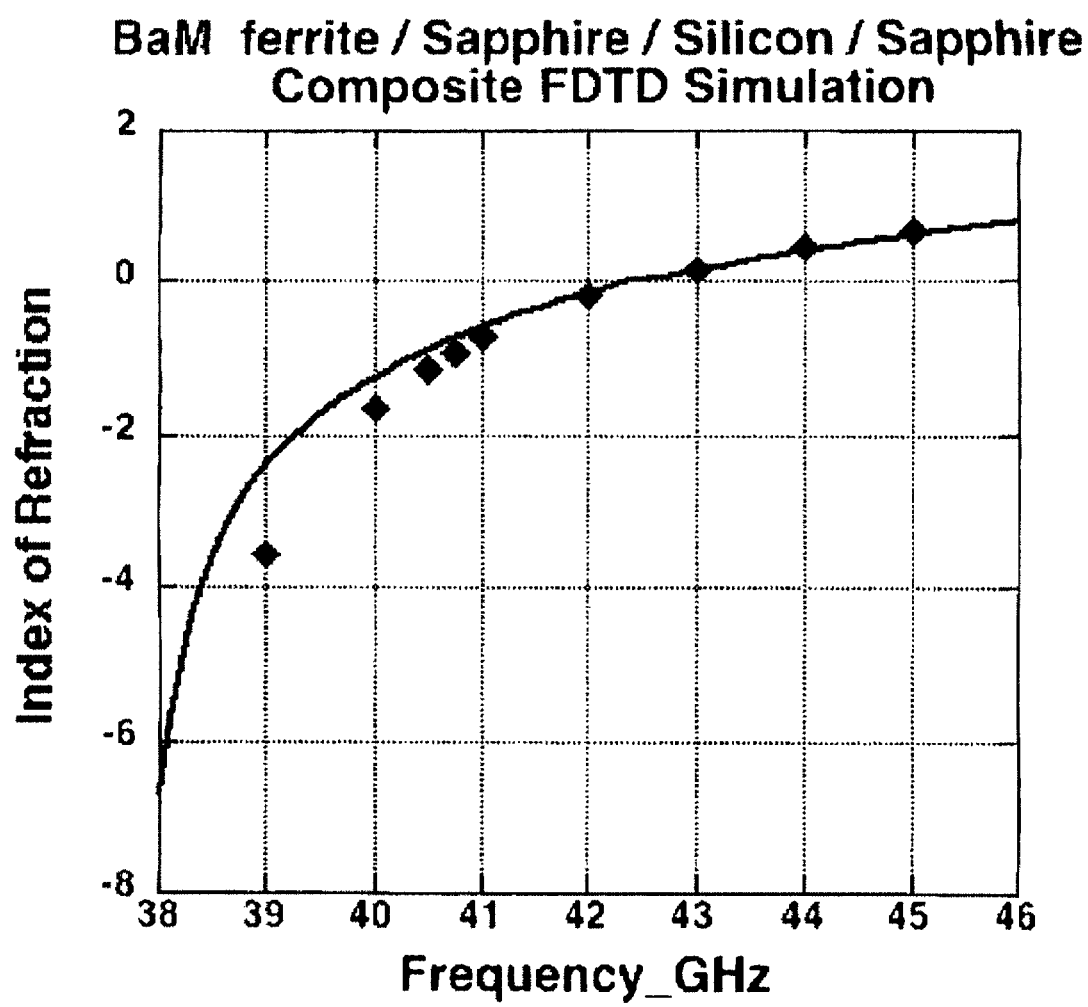
FIG. 6 shows the real part of the index of refraction of the composite at several different frequencies.

FIG. 6 shows the real part of the index of refraction of this composite at several different frequencies. The diamonds indicate the index derived from single frequency finite difference time domain simulation while the solid line is the mean field estimate. Wave propagation in the composite does verify the effect.

Frequency tuning of the index of refraction and bulk impedance of the composite can be affected by the continuous application of a magnetic field to modulate the permeability of the ferrite, as is well known in the art of magnetic resonance. Frequency tuning can also be done by changing the carrier density in the semiconductor component by direct carrier injection or by light excitation of carriers into the conduction band or by thermal modulation. Drude theory may be used to determine the relationship between carrier concentration and plasma frequency. For ferrites with planar anisotropy large variations in the permeability may be effected in the ferrite for a linearly polarized incident electromagnetic field by steering the ferrite magnetization with a rotatable magnetic in plane field.

The composite structure described may be made of structurally stable and durable materials in contrast to the circuit board composites presently used. The index of refraction can be tuned by exciting or injecting carriers into the semiconductor components and/or by applying an appropriate magnetic field acting on the ferrite components since the index is the product of the square root of the permittivity times the square root of the permeability where it is understood that if both are negative the index is negative, $n=\sqrt{\epsilon}\cdot\sqrt{\mu}$. In addition, the bulk impedance of the medium can be independently varied since it is the ratio of the square root of the permeability to the square root of the permittivity, $z=\sqrt{\epsilon}\div\sqrt{\epsilon}$. By controlling the carrier density and magnetic field the index of refraction and the bulk impedance of the composite medium can be tuned simultaneously over a frequency band above magnetic resonance. The ability to tune the index of refraction will permit dynamic variation or modulation of the optical properties of the composite. When the composite is incorporated in an optical device the effective focal length and other optical properties of the device can be rapidly changed. In addition the bulk impedance of the medium can be chosen or tuned to be equal to the impedance of free space, eliminating front surface and internal reflections when the composite is bounded by free space. Similarly impedance match can be chosen or tuned when the composite is adjacent to other media such as other elements in an optical device. In some applications the stack index of refraction can be tuned to be strongly imaginary and the composite absorbing or bulk impedance can be changed to present a strong mismatch and be highly reflecting when opacity is desired such as to protect sensitive detectors from damaging high power in electromagnetic radiation or to provide switchable stealth capabilities.

The incorporation of negative index elements in optical assemblies may offer significant advantages in producing enhanced field of view, compactness, and enhanced correction of aberrations beyond what is possible with purely positive index materials.

What is claimed is:

1. A composite comprising:
    a stack of a repeating unit of layers of, in order:
        a layer of a nonconductive magnetic material;
        a first layer of a dielectric material;
        a layer of a semiconducting material; and
        a second layer of the dielectric material;

wherein the composite has a magnetic resonance frequency;

wherein the composite has a magnetic anti-resonance frequency at a higher frequency than the magnetic resonance frequency;

wherein the composite has a plasma frequency at a higher frequency than the magnetic resonance frequency.

2. The composite of claim 1, wherein the thickness of the repeating unit of layers is no more than about the wavelength of the magnetic anti-resonance frequency.

3. The composite of claim 1, wherein the thickness of the repeating unit of layers is no more than about one fifth of the wavelength of the magnetic anti-resonance frequency.

4. The composite of claim 1, wherein the thickness of the repeating unit of layers is no more than about one tenth of the wavelength of the magnetic anti-resonance frequency.

5. The composite of claim 1, wherein the thickness of the repeating unit of layers is no more than about one twentieth of the wavelength of the magnetic anti-resonance frequency.

6. The composite of claim 1, wherein the plasma frequency is within about 5% of the magnetic anti-resonance frequency.

7. The composite of claim 1, wherein the stack contains at least two repetitions of the repeating unit of layers.

8. The composite of claim 1, wherein the stack contains from 10 to 1000 repetitions of the repeating unit of layers.

9. The composite of claim 1, wherein the magnetic material is a ferrite.

10. The composite of claim 1, wherein the magnetic material is barium M ferrite.

11. The composite of claim 1, wherein the dielectric material is sapphire, magnesium oxide, or air.

12. The composite of claim 1, wherein the dielectric material has a loss tangent less than about 0.05 in the frequency range between the magnetic anti-resonance frequency and the plasma frequency.

13. The composite of claim 1, wherein the semiconducting material is silicon, lightly doped silicon, gallium arsenide, or lightly doped gallium arsenide.

14. The composite of claim 1, wherein the semiconducting material comprises quantum well structures.

15. A method comprising:

providing the composite of claim 1;

designating a band of operation containing the magnetic anti-resonance frequency; and wherein the composite has a maximum absolute value of the index of refraction within the band of operation; and wherein the thickness of the repeating unit of layers is no more than about one fifth of the free space wavelength of the magnetic anti-resonance frequency divided by the maximum absolute value of the index of refraction; and transmitting light or allowing the transmission of light through the composite;

wherein the frequency of the light is in the band of operation.

16. The method of claim 15, wherein the thickness of the repeating unit of layers is no more than about one tenth of the free space wavelength of the magnetic anti-resonance frequency divided by the maximum absolute value of the index of refraction.

17. A method comprising:

providing the composite of claim 1; and applying a magnetic field to the composite to shift the magnetic resonance frequency.

18. A method comprising:

providing the composite of claim 1; and exciting or injecting carriers into the semiconductor to shift the plasma frequency.

* * * * *